United States Patent
Choi et al.

(10) Patent No.: US 10,341,672 B2
(45) Date of Patent: Jul. 2, 2019

(54) METHOD AND SYSTEM FOR MEDIA SYNCHRONIZATION

(71) Applicant: Korea Advanced Institute of Science and Technology, Yuseong-gu, Daejeon (KR)

(72) Inventors: JunKyun Choi, Daejeon (KR); Hyo Jin Park, Daejeon (KR)

(73) Assignee: KOREA ADVANCED INSTITUTE OF SCIENCE AND TECHNOLOGY, Yuseong-gu, Daejeon (KR)

( * ) Notice: Subject to any disclaimer, the term of this patent is extended or adjusted under 35 U.S.C. 154(b) by 27 days.

(21) Appl. No.: 15/662,986

(22) Filed: Jul. 28, 2017

(65) Prior Publication Data

US 2018/0227586 A1    Aug. 9, 2018

(30) Foreign Application Priority Data

Feb. 3, 2017  (KR) .................. 10-2017-0015321
Jun. 27, 2017 (KR) .................. 10-2017-0081223

(51) Int. Cl.
| | | |
|---|---|---|
| H04L 29/06 | (2006.01) | |
| H04N 19/31 | (2014.01) | |
| H04N 19/597 | (2014.01) | |
| H04N 19/61 | (2014.01) | |
| H04N 19/615 | (2014.01) | |

(Continued)

(52) U.S. Cl.
CPC .......... *H04N 19/31* (2014.11); *H04N 19/597* (2014.11); *H04N 19/61* (2014.11); *H04N 19/615* (2014.11); *H04N 21/21805* (2013.01); *H04N 21/2401* (2013.01); *H04N 21/242* (2013.01); *H04N 21/4307* (2013.01); *H04N 21/2365* (2013.01); *H04N 21/2662* (2013.01); *H04N 21/4347* (2013.01)

(58) Field of Classification Search
None
See application file for complete search history.

(56) References Cited

U.S. PATENT DOCUMENTS

| | | | |
|---|---|---|---|
| 2003/0048811 A1* | 3/2003 | Robie, Jr. ............. | H04J 3/0667 370/509 |
| 2005/0135429 A1* | 6/2005 | Bingham ................ | G06F 1/14 370/503 |

(Continued)

FOREIGN PATENT DOCUMENTS

| | | |
|---|---|---|
| JP | 2014011529 A | 1/2014 |
| KR | 20060105449 A | 10/2006 |

(Continued)

*Primary Examiner* — Brandon M Renner
(74) *Attorney, Agent, or Firm* — Heslin Rothenberg Farley & Mesiti, P.C.

(57) ABSTRACT

A method and a system for media synchronization are described. The method for media synchronization may include collecting stream source information, generating network delay information between stream sources by performing a delay test between the stream sources, setting synchronization information of a stream source corresponding to a specific channel based on the collected stream source information and the network delay information, measuring network delay with at least one user terminal to receive the stream source, and updating the synchronization information based on the measured network delay.

19 Claims, 12 Drawing Sheets

(51) Int. Cl.
    *H04N 21/218*     (2011.01)
    *H04N 21/24*     (2011.01)
    *H04N 21/242*     (2011.01)
    *H04N 21/43*     (2011.01)
    H04N 21/2365     (2011.01)
    H04N 21/2662     (2011.01)
    H04N 21/434     (2011.01)

(56) References Cited

U.S. PATENT DOCUMENTS

| | | | | |
|---|---|---|---|---|
| 2008/0117937 A1* | 5/2008 | Firestone | ............ | H04N 5/4401 |
| | | | | 370/503 |
| 2015/0030022 A1* | 1/2015 | Mantin | ................... | H04L 65/80 |
| | | | | 370/390 |
| 2015/0131649 A1* | 5/2015 | Gibbons | ............... | H04J 3/0632 |
| | | | | 370/352 |
| 2017/0187955 A1* | 6/2017 | Fink | ........................ | H04N 5/247 |

FOREIGN PATENT DOCUMENTS

| | | | |
|---|---|---|---|
| KR | 20060109487 A | 10/2006 | |
| KR | 20150072231 A | 6/2015 | |
| KR | 20160048942 A | 5/2016 | |

\* cited by examiner

900

METHOD AND SYSTEM FOR MEDIA SYNCHRONIZATION

This application claims the priority benefit of Korean Patent Application No. 10-2017-0015321 and of Korean Patent Application No. 10-2017-0081223, respectively filed on Feb. 3, 2017 and Jun. 27, 2017, in the Korean Intellectual Property Office, the disclosure of which is incorporated herein by reference.

BACKGROUND

Field of the Invention

The following example embodiments relate to a method and a system for media synchronization synchronizing and providing a stream which is provided in providing various content sources to a user terminal in a real time in a broadcast environment.

Description of the Related Art

As a broadcast environment becomes more sophisticated and diversified, a number of media streams for one event are generated based on various types of media sources such as an action camera, a drone camera, and the like and provided to a user terminal.

FIG. 1 illustrates an example of describing a network configuration that various types of media stream sources are provided to a user terminal.

Referring to 110 of FIG. 1, a recording subject 101 may be recorded with a plurality of drone cameras, and at least one drone camera, action camera, and the like may record the recording subject 101. Also, a media stream corresponding to a video recorded from each device is provided to the user terminal through a server.

Referring to 120 of FIG. 1, in VR (Virtual Reality) environment, a research that a VR gear provides panoramic contents in up to 24 tiles in order to provide high-quality contents has proceeded. Here, the VR gear should provide exact synchronization for the area of multi-tile corresponding to a user's view.

However, as recording devices such as a drone camera, an action camera, and the like recording the same recording subject 101 are different each other, delays occur according to H/W (Hardware) characteristics for each device and codec characteristics of each device. Also, a time difference (i.e. delay) occurs in a process of providing stream sources to a plurality of user terminals in the server. In other words, a time difference (i.e. delay) between sources corresponding to each of a plurality of recording devices and a time difference (i.e. delay) in each transmission section in the process of providing stream sources to the plurality of user terminals occur. Accordingly, when the user terminal would like to correct each of stream sources to various application forms such as PIP (Picture in Picture), multi-view viewing, and the like, synchronization between a plurality of stream sources is required. Because in the case of VR environment besides PIP and multi-view viewing, a time difference between a plurality of tiles corresponding to the user's view occurs, synchronization is required. For example, in 120 of FIG. 1, synchronization for 6 tiles 121 corresponding to a user's view is required.

Korean Patent Publication No. 10-2006-0105449 relates to multi-view scalable image encoding, decoding method and its apparatus, discloses technology for providing a user with multiple scenes simultaneously recorded for one subject or one scene according to locations of the camera by providing scalability in spatial-axis and in temporal-axis directions with filtering multi-view images input from a plurality of cameras in spatial-axis and in temporal-axis directions.

SUMMARY

At least one example embodiment provides a method and a system for media synchronization that perform media synchronization considering delays occurred in H/W characteristic differences and codec characteristic differences for each recording device and delays occurred in a process of providing stream sources generated from each of a plurality of recording devices to a plurality of user terminals when each of the plurality of different forms of recording devices (e.g., an action camera, a drone camera, and the like) records a same recording subject (e.g., an object or a scene) and provides it to the user terminals.

According to an aspect of at least one example embodiment, a method for media synchronization may include collecting stream source information, generating network delay information between stream sources by performing a delay test between the stream sources, setting synchronization information of a stream source corresponding to a specific channel based on the collected stream source information and the network delay information, measuring network delay with at least one user terminal to receive the stream source, and updating the synchronization information based on the measured network delay.

The method may further include performing time synchronization with the user terminal based on time clock of the user terminal.

The performing time synchronization with the user terminal may include requesting time clock of a corresponding terminal to each of a plurality of user terminals when the plurality of user terminals requests to provide the stream source, receiving time clock of a corresponding terminal from each of the plurality of user terminals in response to the requesting of the time clock, and performing time synchronization between the plurality of user terminals based on the received time clock.

The performing time synchronization between the plurality of user terminals based on the received time clock may include generating a common time stamp based on the time clock of the corresponding terminal and identifier information of the corresponding terminal, and providing a stream inserted with the generated common time stamp to each of the plurality of user terminals.

The performing time synchronization with the user terminal may include generating time clock between a system for media synchronization and the user terminal based on the time clock of the user terminal, generating a common time stamp including synchronized time based on the generated time clock, and inserting the generated common time stamp in each stream corresponding to different channels to be transmitted and transmitting the each stream to the user terminal.

The stream inserted with the common time stamp may be played in accordance with decoding time based on the common time stamp.

The collecting stream source information may collect device profile information or manifest information of a source device from the source device providing the stream source.

The setting synchronization information of stream source may include determining whether a plurality of stream sources is synchronized with each other after arranging the plurality of sources in asset form when the plurality of stream sources is provided to a user terminal, and performing synchronization between the sources by setting synchronization information of each of the plurality of stream sources based on the determination result.

The performing time synchronization with the user terminal may include correcting a time difference between the stream source received from a source device and stream to transmit to the user terminal.

The collecting information may collect delay information from a source device forming the user terminal and the network and the user terminal and the performing time synchronization with the user terminal may control the synchronization function between the user terminals to be off based on the collected delay information.

According to an aspect of an example embodiment, a system for media synchronization may include a collecting unit configured to collect stream source information, a delay information generating unit configured to generate network delay information between stream sources by performing a delay test between the stream sources, a synchronization information setting unit configured to set synchronization information of a stream source corresponding to a specific channel based on the collected stream source information and the network delay information, a delay measuring unit configured to measure network delay with at least one user terminal to receive the stream source, and a synchronization information updating unit configured to update the synchronization information based on the measured network delay.

The system may further include a terminal synchronizing unit configured to perform time synchronization with the user terminal based on time clock of the user terminal.

The terminal synchronizing unit may request time clock of a corresponding terminal to each of a plurality of user terminals when the plurality of user terminals requests to provide the stream source, receive time clock of a corresponding terminal from each of the plurality of user terminals in response to the requesting of the time clock, and perform time synchronization between the plurality of user terminals based on the received time clock.

The terminal synchronizing unit may generate a common time stamp based on the time clock of the corresponding terminal and identifier information of the corresponding terminal and provide a stream inserted with the generated common time stamp to each of the plurality of user terminals.

The terminal synchronizing unit may generate time clock between the system for media synchronization and the user terminal based on the time clock of the user terminal, generate a common time stamp including synchronized time based on the generated time clock, insert the generated common time stamp in each stream corresponding to different channels to be transmitted, and transmit the each stream to the user terminal.

The stream inserted with the common time stamp may be played in accordance with decoding time based on the common time stamp.

The information collecting unit may collect device profile information or manifest information of a source device from the source device providing the stream source.

The synchronization information setting unit may determine whether a plurality of stream sources is synchronized with each other after arranging the plurality of sources in asset form when the plurality of stream sources is provided to a user terminal and perform synchronization between the sources by setting synchronization information of each of the plurality of stream sources based on the determination result.

According to an aspect of an example embodiment, a method for media synchronization in a user terminal may include providing time clock of a terminal to a server providing a stream source and synchronizing decoding time between other user terminals or a plurality of stream sources provided with the stream source from the server based on common time stamp including synchronized time based on the provided time clock.

The common time stamp may include synchronized time between the server and the terminal generated from the server based on the time clock of the terminal, and the synchronizing may synchronize decoding time between the plurality of stream sources based on the common time stamp including the synchronized time between the server and the terminal.

The common time stamp may include synchronized time between terminals generated from the server based on time clock of each of a plurality of user terminals, and the synchronizing may synchronize with other user terminals provided with the stream source based on the common time stamp including the synchronized time between the terminals.

A user terminal performing media synchronization may include time clock providing unit configured to provide time clock of a terminal to a server providing a stream source and a synchronizing unit configured to synchronize decoding time between other user terminals or a plurality of stream sources provided with the stream source from the server based on common time clock including synchronized time based on the provided time clock.

According to example embodiments, a method and a system for media synchronization may provide a stream source synchronized with a same recording subject to a user terminal when PIP, multi-view viewing, and the like is selected in the user terminal by performing media synchronization considering delay occurred in H/W characteristic differences and codec characteristic differences for each recording device, and delays occurred in a process of providing stream sources generated from each of a plurality of recording devices to a plurality of user terminals when each of a plurality of different forms of recording devices (e.g., an action camera, a drone camera, and the like) records a same recording subject (e.g., an object or a scene) and provides it to user terminals.

Also, when media is synchronized in VR environment besides PIP, multi-view viewing, more precisely synchronized tiles for a plurality of tiles corresponding to a user's view may be provided.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
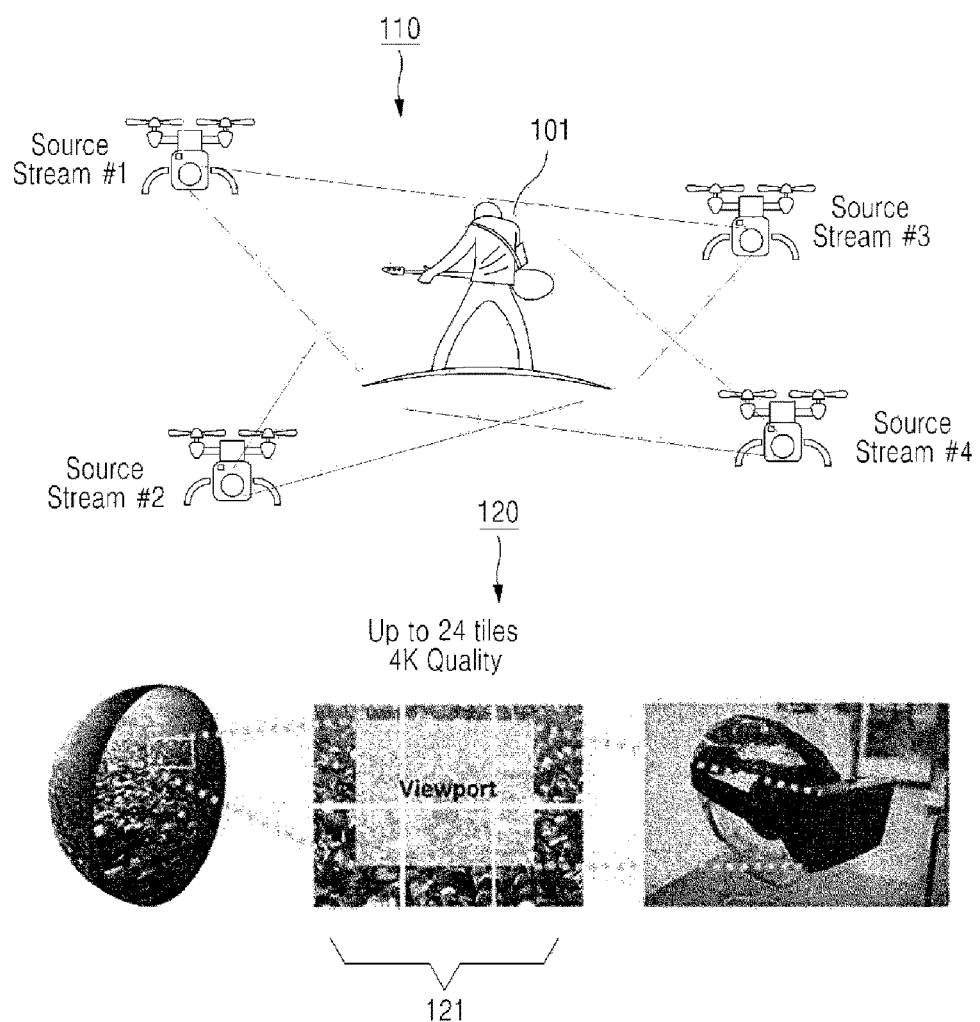
FIG. 1 illustrates an example of describing a network configuration that various types of media stream sources are provided to a user terminal.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Also, terminologies used herein refer to terms used to appropriately represent the example embodiments and may vary based on a reader, the intent of an operator, or custom of a field to which this disclosure belongs, and the like. Accordingly, the definition of the terms should be made based on the overall description of the present specification.

The example embodiments relates to a technology synchronizing time between sources considering delay between stream sources recorded from each of a plurality of recording devices when video recorded from a plurality of different recording devices is provided to a user terminal from a server and performing media synchronization considering delay occurred in each section between a server and each terminal when the server provides the stream sources to a plurality of user terminals, particularly, a technology performing media synchronization for each of multi-channel forms of services provided in the same stream such as multi-view viewing, PIP (Picture In Picture), and the like. In other words, it relates to a technology synchronizing media considering delay caused by each of codec characteristics and H/W characteristics in a process that stream source (i.e., media source) is generated separately in each of the recording devices and delay occurred in a process of restoring stream source through de-packetizing in a user terminal in a process that the stream source is segmented and transmitted by packetizing the stream source due to characteristics of IP transmission method. Also, in the case of VR (Virtual Reality), as real-time access and release to 24 content streaming channels must be repeated according to FoV (Field of View) of a user, it relates to a technology maintaining synchronization to each of sources when repeating real-time access and release.

In the example embodiments, 'time synchronization' may include time stamp level synchronization, device time (i.e. time clock of a terminal) level synchronization, and time synchronization on network.

In the example embodiments, 'a system for media synchronization' may indicate a server providing stream source (i.e. media source) to a user terminal. Also, 'a user terminal' may indicate an IP TV (Internet Protocol Television), a VR (Virtual Reality) device, a PC, a smartphone, a tablet, and the like.

Figure 2:
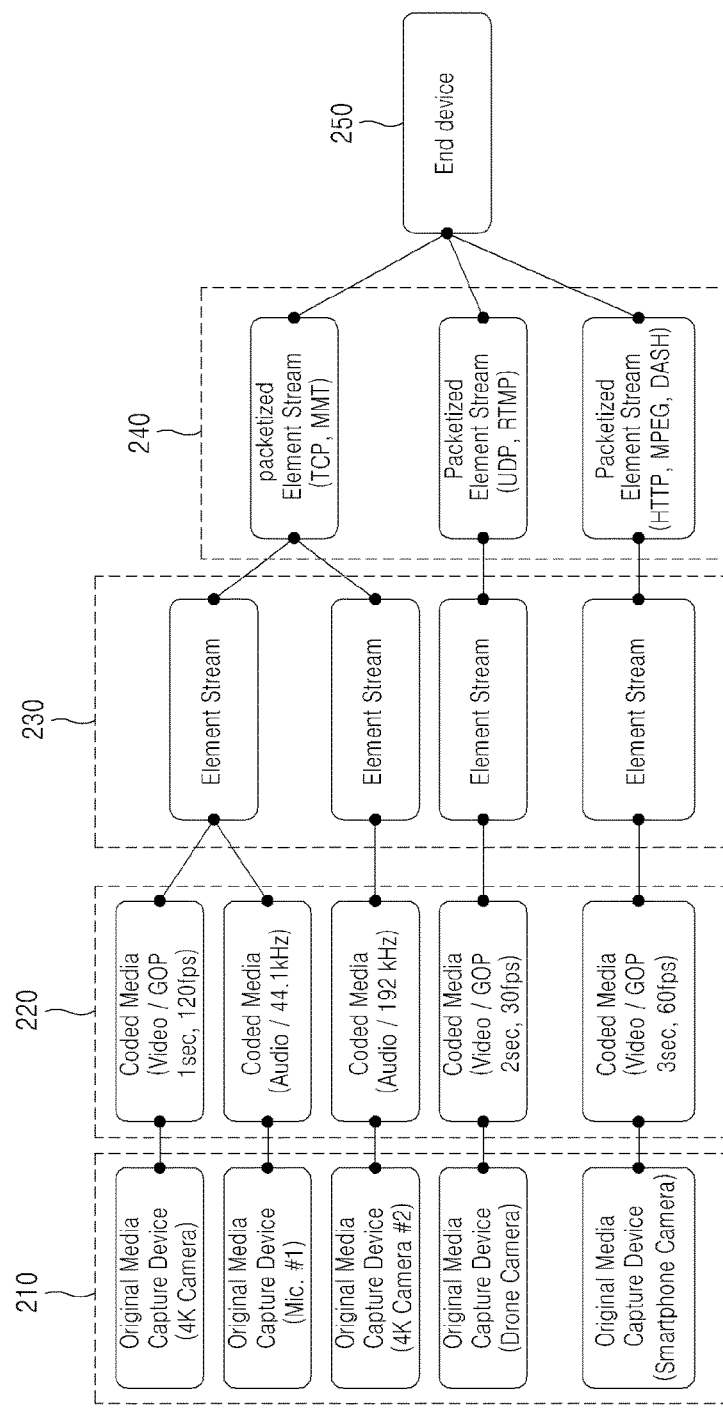
FIG. 2 illustrates an example of describing a network environment providing stream sources according to an example embodiment.

FIG. 2 illustrates an example of describing a network environment providing stream sources according to an example embodiment.

Referring to FIG. 2, a network 200 may include a plurality of media capture devices 210, encoding devices 220 installed in each capture device 210, stream uploaders 230, a system for media synchronization 240, and at least one user terminal 250.

In FIG. 2, the media capture devices 210, the encoding devices 220 and the stream uploaders 230 may be implemented as one system or device, and the media capture devices 210, the encoding devices 220, the stream uploaders 230, and the system for media synchronization 240 may be implemented as one system or device.

The media capture devices 210 as devices of drone cameras, action cameras, cameras for broadcasting, microphones, and the like, may record a recording subject (e.g., the same object or the same scene) and transmit the generated audio signal or video signal to encoding devices 220.

The encoding devices 220 as devices of performing encoding for the generated or captured signal may correspond to codec installed as S/W (Software) in the media capture devices 210. For example, video codec and audio codec such as MPEG-2 (Moving Pictures Exports Group-2), H.264, and the like may correspond.

The stream uploaders 230 may upload the encoded stream sources (i.e. Element Streams) in the encoding devices 220 to the system for media synchronization 240 which is a server. For example, the stream uploaders 230 may be implemented as a form of application, and installed and executed in the media capture devices 210. For example, the media capture devices 210 may upload the generated ES (Element Stream) encoded in the encoding devices 220 through the application to the system for media synchronization 240 which is a server.

The system for media synchronization 240 may perform packetizing for the ES corresponding to a plurality of media capture devices and provide the packetized streams to the user terminal 250. Here, the system for media synchronization 240 may perform time stamp level synchronization, device time level synchronization, and time synchronization on network considering network delay when the system for media synchronization 240 provides the packetized streams to the user terminal 250.

Figure 3:
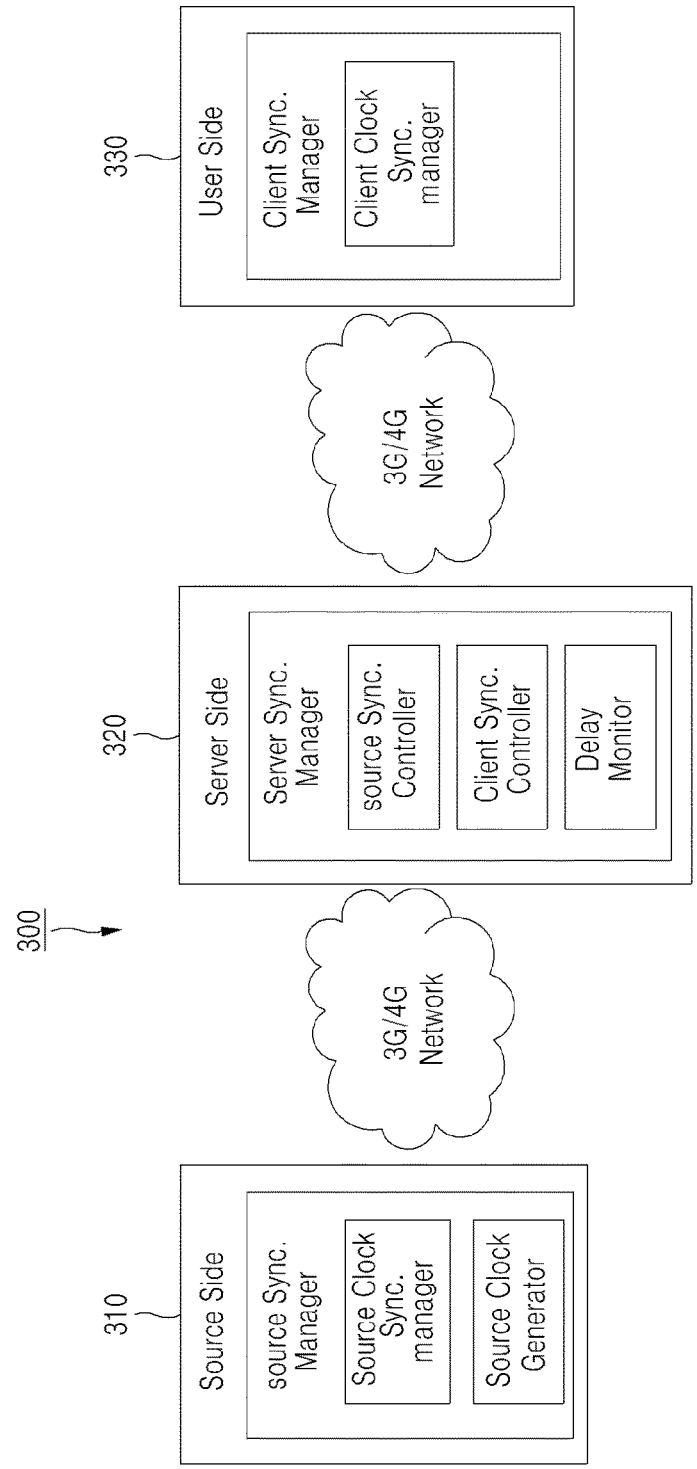
FIG. 3 illustrates an example of describing a network environment synchronizing multi-source streams according to an example embodiment.

FIG. 3 illustrates an example of describing a network environment synchronizing multi-source streams according to an example embodiment.

Referring to FIG. 3, a network 300 may include a source device 310, a server 320, and a user terminal 330, and the server 320 may correspond to the system for media synchronization 240 of FIG. 2 and the user terminal 330 may correspond to the user terminal 250 of FIG. 2. Also, the source device (310) may correspond to all or part of the media capture devices 210, the encoding devices (220), and the stream uploaders 230 of FIG. 2.

For example, the source device 310 may include all of the media capture devices 210, the encoding devices 220, and the stream uploaders 230 of FIG. 2, and may be connected separately with the media capture devices 210 and the encoding devices 220, and include only the stream uploaders 230.

The source device 310 may include a source synchronization manager, and the source synchronization manager may include a source clock synchronization manager and a source clock generator.

The source synchronization manager may be interlocked with a server synchronization manager of the server 320 on the source device 310 and perform a role of synchronizing time. Also, the source synchronization manager may handle time clock of OS (Operating System), and may be implemented as a form of application or clock device controller for handling. The source synchronization manager may directly set information such as time, codec, frame rate, and the like.

The source clock synchronization manager may provide a function for clock synchronization with other source devices. For example, when information related to at least one other source device through a source synchronization controller of the server 320 is acquired, the source clock synchronization manager may synchronize clock with other source devices based on the acquired information.

The source clock generator may generate system level clock to amend clock when another clock is used between the source device 310 and another source device.

The server 320 may include a sever synchronization manager, and the server synchronization manager may include a source synchronization controller, a client synchronization controller, and a delay monitor.

The server synchronization manager may correspond to a module for synchronizing between the source device 310 and the user terminal 330.

The source synchronization controller may synchronize between the source device 310 and other source devices. For example, when there is a plurality of source devices such as drone cameras, action cameras, and the like recording the same recoding subject, the source synchronization controller may determine whether stream sources generated from each of the plurality of source devices is synchronized after arranging the stream sources in a media asset form and perform synchronization to synchronize between the stream sources when the stream sources are not synchronized. Here, when the media asset transmits media of several sources to a single stream, the media asset may indicate a logical separation of the several sources, and when transmitting the stream sources arranged in the media asset form, each packet may be displayed and transmitted what information of media source is contained.

The client synchronization controller may synchronize between a plurality of user terminals when stream sources are provided to the plurality of user terminals.

The delay monitor may measure channel delay in a network section and derive a delay value for synchronizing based on the measured channel delay.

The user terminal 330 may include a client time synchronization manger, and the client time synchronization manager may include a client clock synchronization manager.

The client time synchronization manager may be used for performing synchronization in a user terminal. For example, the client time synchronization manager may be implemented as a form of application and software, and set and release delay based on the time clock received from the server 320 for synchronizing between terminals.

Client clock synchronization manager may synchronize clock on the user terminal 330. For example, when a plurality of stream sources has unsynchronized clock, the client clock synchronization manager may amend the unsynchronized clock.

Figure 4:
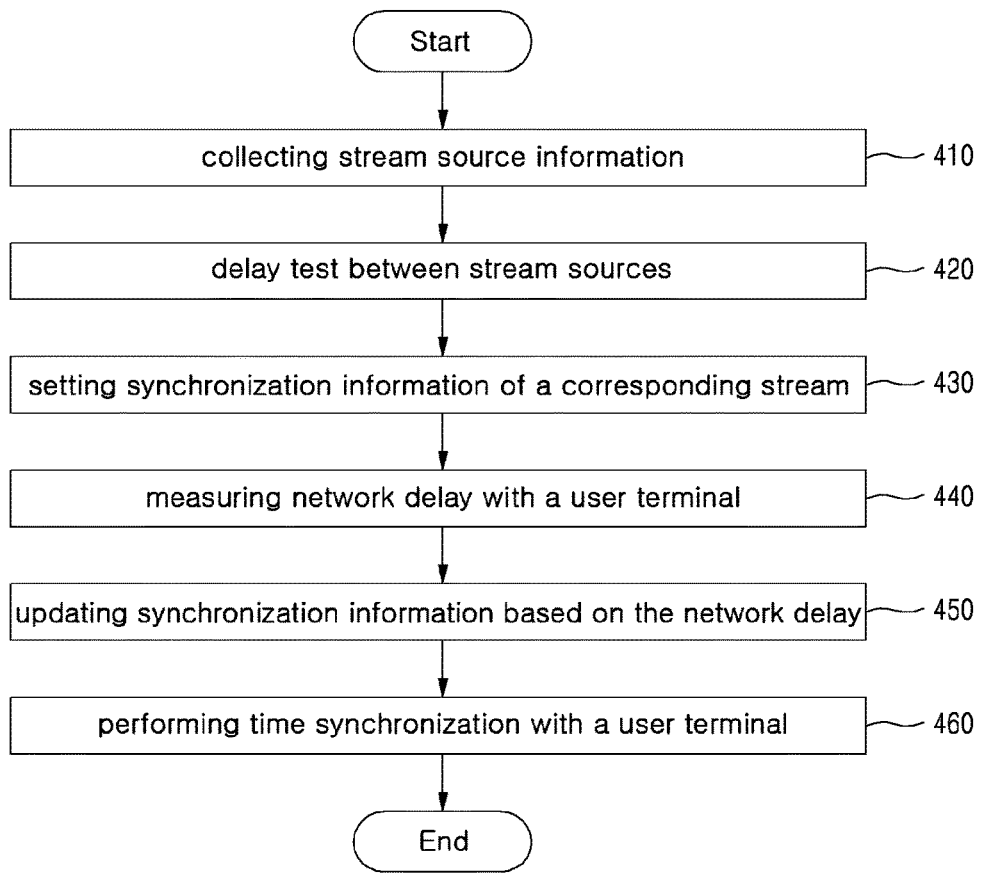
FIG. 4 is a flow chart illustrating an operation of a method for media synchronization according to an example embodiment.
Figure 5:
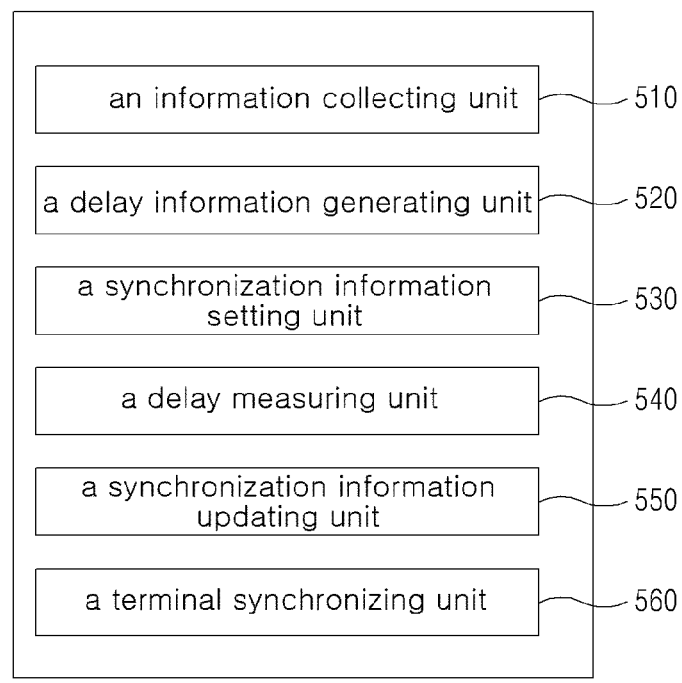
FIG. 5 is a block diagram illustrating an internal configuration of a system for media synchronization according to an example embodiment.

FIG. 4 is a flow chart illustrating an operation of a method for media synchronization according to an example embodiment and FIG. 5 is a block diagram illustrating an internal configuration of a system for media synchronization according to an example embodiment.

A system for media synchronization 500 of FIG. 5 may include an information collecting unit 510, a delay information generating unit 520, a synchronization information setting unit 530, a delay measuring unit 540, a synchronization information updating unit 550, and a terminal synchronizing unit 560. Also, the information collecting unit 510, the delay information generating unit 520, the synchronization information setting unit 530, and the synchronization information updating unit 550 may correspond to the source synchronization controller of FIG. 3, the delay measuring unit 540 may correspond to the delay monitor, and the terminal synchronizing unit 560 may include the client synchronization controller.

Each of operations (operations 410 to 460) of FIG. 4 may be performed by the information collecting unit 510, the delay information generating unit 520, the synchronization information setting unit 530, the delay measuring unit 540, the synchronization information updating unit 550, and the terminal synchronizing unit 560 which are components of FIG. 5.

In operation 410, the information collecting unit 510 may collect stream source information.

For example, the information collecting unit 510 may set operation state to a listen state for connecting with the source device 310 to receive uploaded stream source. For example, operation state of the source synchronization controller of FIG. 3 may be set to a listen state.

Here, the source device 310 may be a single device and a plurality of devices, and may prepare a connection with each source device to receive uploaded stream source from each of a plurality of source devices when there is the plurality of source devices. For example, if there is a sub network or a separate server or a server on a cloud when a separate mobile server is used, the source device 310 and the system for media synchronization 500 which is a server may be connected through URL (Uniform Resource Locator) and the like. Then, the information collecting unit 510 may collect stream source information from each of a plurality of connected source devices, and may store and manage by matching the collected stream source information and identifier information of a corresponding source device.

Here, the stream source information may include H/W characteristic information and S/W characteristic information, and the H/W characteristic information may include device profile information registered or predefined in a corresponding source device or feature information set separately by a manager/a user. Also, S/W characteristic information may include codec characteristic information and frame rate information, and the like determined based on the device profile. For example, the H/W characteristic information may include a device model name of a corresponding source device, admin define delay value (ms) of the corresponding source device, processor/chipset information, OS information, output interface information, and the like.

Here, the stream source information may be collected as a form of manifest information besides the device profile information.

In operation 420, the delay information generating unit 520 may generate network delay information between the source devices by performing a delay test between stream sources corresponding to each of connected source devices. Here, the delay information generating unit 520 may understand network section delay characteristic information between the stream sources through the delay test.

For example, the delay information generating unit 520 may measure time and a time difference that corresponding information is transmitted using flash in a slate form, and may measure time by performing a delay test through application installed in each of the source devices. Also, the delay information generating unit 520 may generate network delay information based on the measured time.

In operation 430, the synchronization information setting unit 530 may set synchronization information of stream source corresponding to a specific channel based on the collected stream source information and network delay information. In other words, the synchronization information setting unit 530 may set synchronization information with each of the connected source devices.

For example, the synchronization information setting unit 530 may set synchronization information for stream source to be served in one channel form. Also, the synchronization information setting unit (530) may transmit the synchronization information set for each source device to a corresponding source device based on identifier information of the corresponding source device. Then, the corresponding source device may receive synchronization information from the system for media synchronization 500 which is a server, and synchronize time with the system for media synchronization 500 by changing setting of a device or software based on the received synchronization information. For example, the synchronization information setting unit 530 may calculate a time difference that stream source is uploaded from each of source devices based on the information of physical delay of stream source and delay time to a streaming server (i.e. delay time in the network section). Also, the synchronization information setting unit 530 may set delay difference between stream sources based on the calculated time difference, synchronize on the server side, and then transmit to the terminal. In other words, when time synchronization between the source device 310 and the system for media synchronization 500 which is a server is completed (i.e. time is synchronized), the system for media synchronization 500 may receive uploaded stream source from the source device 310. In other words, media stream service may be started.

Here, when delay time with the system for media synchronization 500 which is a server among a plurality of source devices is fixed, a fixed synchronization time value for specific source device may be set, and stream source may be transmitted by synchronizing time on the source device side without any separate time adjustment on the server side. Accordingly, time clock of the source device may be updated in order to transmit stream source synchronizing time in the source device.

In operation 440, the delay measuring unit 540 may periodically measure network delay with each connected source device. Here, the network delay may include channel delay formed between the source device 310 and the system for media synchronization 500.

In operation 450, the synchronization updating unit (550) may update synchronization information based on the network delay. In other words, the synchronization updating unit (550) may update synchronization information by combining a value set in the synchronization information based on the collected stream source information and network delay information in operation 430 and the acquired delay information between the server and the terminal in operation 440.

For example, the delay setting information set initially based on the network delay may be amended. For example, when delay that the measured network delay exceeds a set value corresponding to the delay setting information occurs, the synchronization information updating unit 550 may update synchronization information setting of a corresponding source device. In other words, the synchronization information updating unit 550 may update setting of initial synchronization information set between the source device 310 and the system for media synchronization 500 in the operation 430 based on the network delay. When delay occurs in a transmission section between a user terminal and a server, a value for synchronizing delay time between user terminals may be adjusted based on the delay. For example, in a specific subway train, when a user terminal A connects to a server with 4G, a user terminal B connects to the server with WiFi, and delay of WiFi is higher than 4G, a play information time difference between the user terminals may occur. Then, the server may measure a delay value between the user terminals in an adjacent cell or section (utilizing GPS information and the like) and set a value for synchronization. In other words, the initial synchronization information may be set.

In operation 460, the terminal synchronization unit 560 may perform time synchronization with the user terminal 330 based on time clock of the user terminal 330. Here, there may be one user terminal 330 or a plurality of user terminals 330. Here, operation performing time synchronization with the user terminal (330) will be described below referring to FIGS. 6 and 7.

Figure 6:
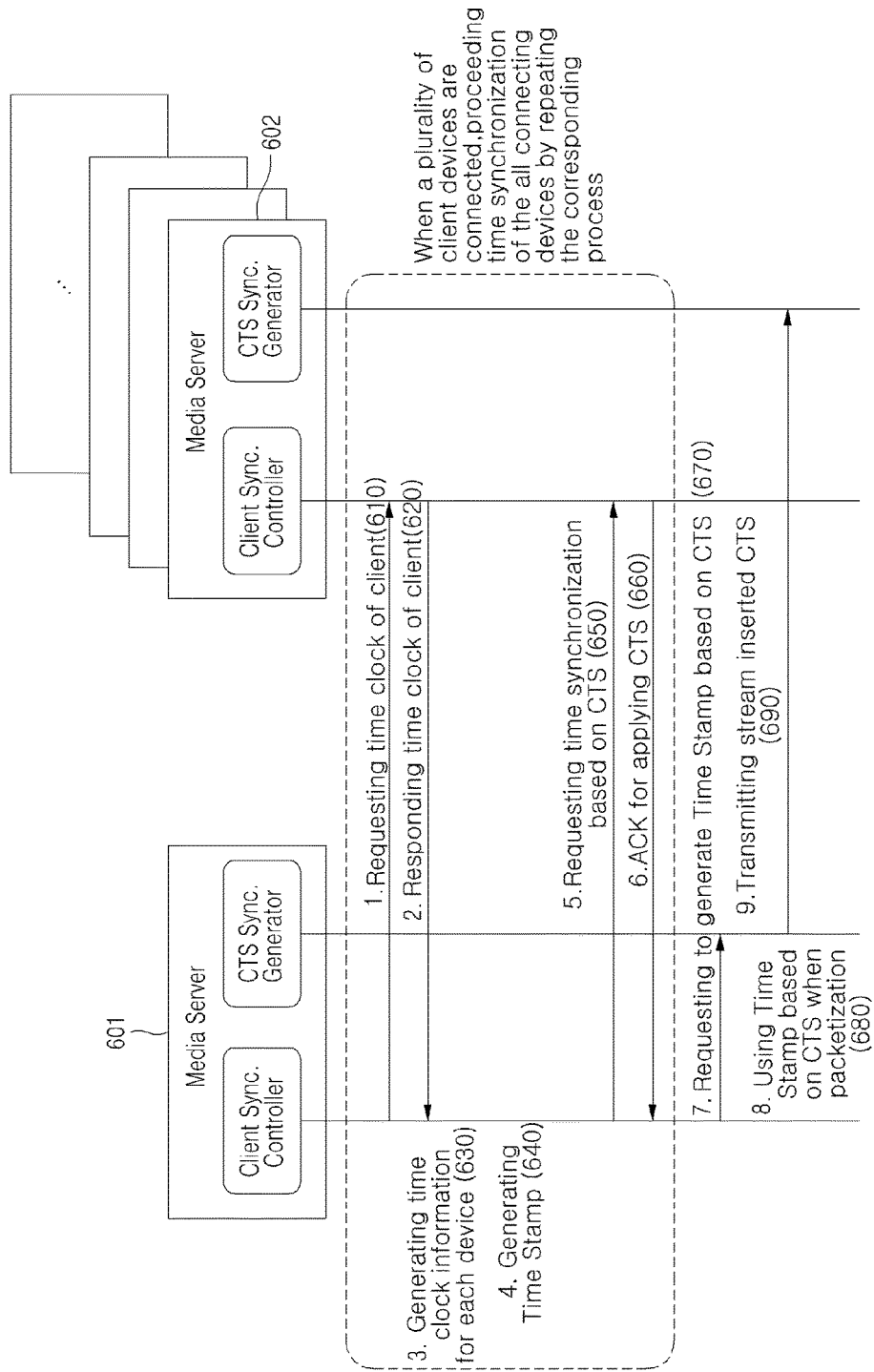
FIG. 6 is a flow chart illustrating an operation controlling delays between a plurality of user terminals according to an example embodiment.

FIG. 6 is a flow chart illustrating an operation controlling delay between a plurality of user terminals according to an example embodiment.

In FIG. 6, although an operation performing synchronization through information transmission and reception with any one user terminal 601 of a plurality of user terminals is mainly described, it corresponds to example embodiments and each of the plurality of user terminals may perform the operation of the user terminal 601. Also, an operation of each of operations (operations 610 to 690) of FIG. 6 may be performed by the terminal synchronizing unit 560 of FIG. 5.

In operation 610, a media server 601 may request time clock of a corresponding terminal to each of a plurality of user terminals.

In operation 620, the media server 601 may receive the time clock of a corresponding terminal from each of the user terminals in response to the request. For example, the terminal synchronizing unit 560 may receive identifier information of a corresponding terminal with time clock of the corresponding terminal from a user terminal (Device #1) 602, match and store and maintain the identifier information of a terminal and time clock of a corresponding terminal.

In operation 630, the terminal synchronizing unit 560 may generate time clock for each terminal based on the received time clock for each terminal. Here, the time clock may mean a time value of the terminal generated by the terminal itself.

In operation 640, the terminal synchronizing unit 560 may generate a CTS (Common Time Stamp) based on the time clock for each terminal.

For example, when a time included in time clock of a user terminal A to receive is 10:00:21 (hour:minute:second) and a time included in time clock of a user terminal B is 10:00:23, a CTS may be provided on a basis of any one information or with setting as separate time. When a separate CTS time is set, the separate CTS time may be set on a basis of a specific standard time considering global service and may be set a common time in each of terminals on a basis of a server time.

In operation 650, the terminal synchronizing unit 560 may request time synchronization based on the generated CTS to each terminal.

In operation 660, the terminal synchronizing unit 560 may receive acknowledgement in a response to the requesting time synchronization based on the CTS. Here, in each of a plurality of user terminals, operation corresponding to operations 610 to 660 may be performed repeatedly and the terminal synchronizing unit 560 may perform time synchronization between each of terminals by receiving acknowledgement from each connected terminal.

In operation 670, the terminal synchronizing unit 560 may request time stamp generation based on the CTS to a CTS synchronization generator. Here, the CTS synchronization generator may be included in the terminal synchronizing unit 560 of FIG. 5.

In operation 680, the terminal synchronizing unit 560 may perform packetizing based on the CTS. For example, the terminal synchronizing unit 560 may insert the CTS to be included in packetized stream source in a process of packetizing.

In operation 690, the terminal synchronizing unit 560 may provide the stream source inserted with the CTS to each of the plurality of user terminals.

Figure 7:
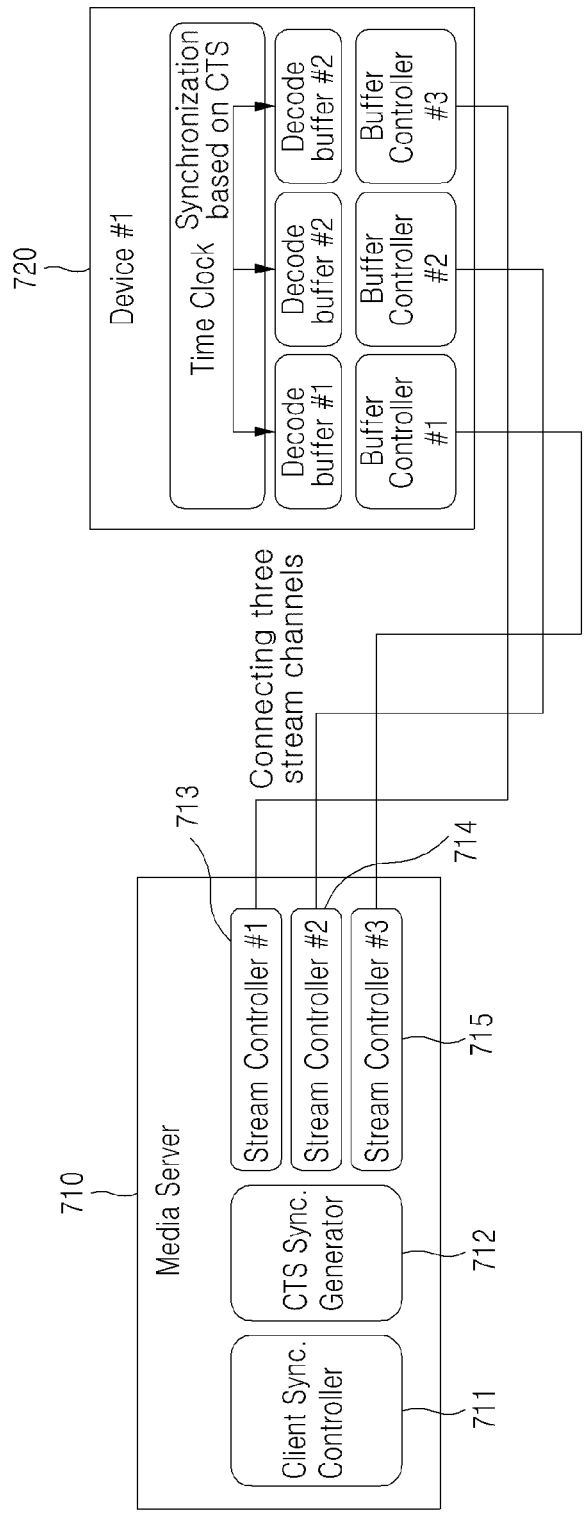
FIG. 7 illustrates an example embodiment of describing a network environment providing a plurality of stream sources to one user terminal in the same server according to an example embodiment.

FIG. 7 illustrates an example embodiment of describing a network environment providing a plurality of stream sources to one user terminal in the same server according to an example embodiment.

An operation of FIG. 7 may be performed by the terminal synchronizing unit 560 of FIG. 5 and an operation of the terminal synchronizing unit 560 among components of a system for media synchronization 710 will be described mainly in FIG. 7. Here, the terminal synchronizing unit 560 may include a client synchronization controller 711, a CTS synchronization generator 712, and at least one stream controller 713, 714, 715. For example, the stream controllers 713, 714, 715 may not be limited three like FIG. 7 and correspond to the number of stream sources. When the number of stream sources is two, there are two stream controllers and when the number of stream sources is five, there are five stream controllers.

The terminal synchronizing unit 560 may request and receive time clock of a corresponding terminal to a user terminal (Device #1) 720 and generate time clock between the system for media synchronization 500 which is a server and the user terminal 720 based on the received time clock.

Also, the terminal synchronizing unit 560 may generate a CTS including synchronized time between the system for media synchronization 500 and the user terminal 720 based on the generated time clock. In other words, time clock of the CTS may be set as the synchronized time.

Also, the terminal synchronizing unit 560 may insert the generated CTS to stream source (i.e. media stream). Here, the terminal synchronizing unit 560 may insert the CTS to each stream source transmitted through the stream controllers 713, 714, 715 and each of the stream controllers 713, 714, 715 may transmit a corresponding stream source to the user terminal 720. In other words, as synchronization with the user terminal 720 is completed, a streaming service to the user terminal 720 may be started.

Then, the user terminal 720 may receive a plurality of stream sources (i.e. multi sources) from the system for media synchronization 500 and generate condition information of a buffer controller corresponding to each of the received stream sources. Here, the condition information may indicate data size of the receiving buffer. In order to provide synchronization based minimum delay, minimum buffer should be used for each stream source and delay information should be adjusted considering the real-time value. Accordingly, condition information indicating data size of receiving buffer may be generated. Also, in a decoder of the terminal, when I-frame (inter frame) among frames configuring stream sources buffered in the decoder buffer is found and started to play, the decoder of the terminal may start to play after adjusting decoding time based on the CTS of each of decode buffers #1, #2, and #3.

Figure 8:
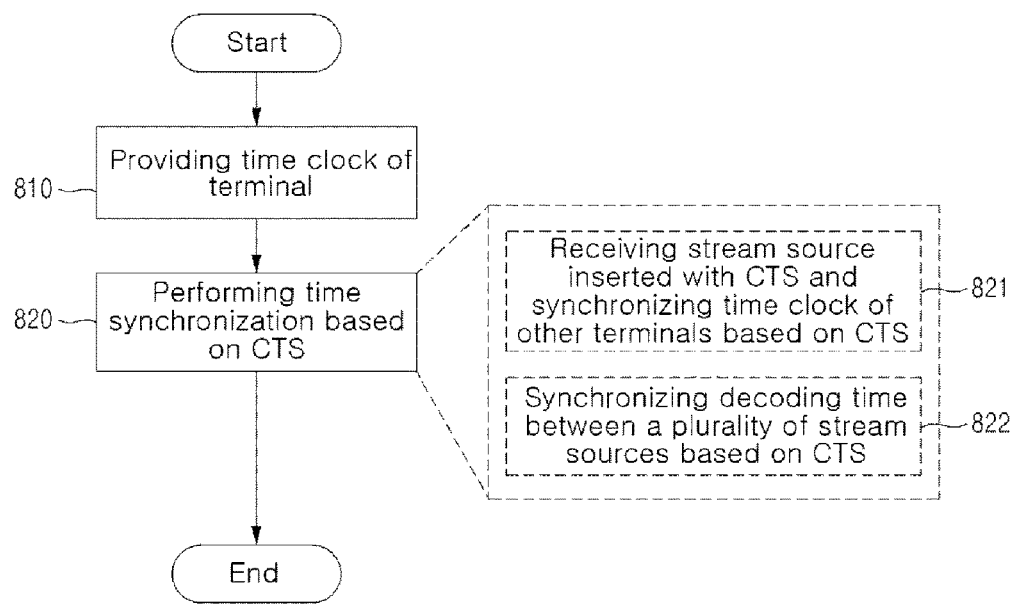
FIG. 8 is a flow chart illustrating an operation performing media synchronization in a user terminal according to an example embodiment.
Figure 9:
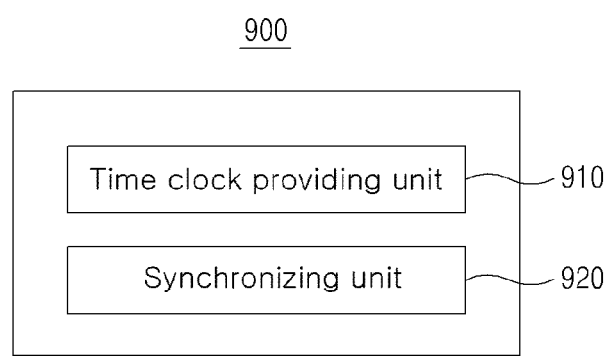
FIG. 9 is a block diagram illustrating an internal configuration of a user terminal according to an example embodiment.

FIG. 8 is a flow chart illustrating an operation performing media synchronization in a user terminal according to an example embodiment and FIG. 9 is a block diagram illustrating an internal configuration of a user terminal according to an example embodiment.

Although FIG. 9 illustrates that a user terminal 900 includes time clock providing unit 910 and a synchronizing unit 920, it corresponds to example embodiments, and the user terminal 900 may further include a rendering unit, a decoding unit, a display unit, an input/output control unit (e.g., a keyboard, a mouse, a microphone, a speaker, a touch pen, and the like), and a wired/wireless communication module.

Each operation (operations 810 to 820) of FIG. 8 may be performed by the time clock providing unit 910 and the synchronizing unit 920 which are components of FIG. 9.

In operation 810, the time clock providing unit 910 may provide its own time clock to the system for media synchronization 500 on receiving a request to provide time clock from the system for media synchronization 500 which is a server.

In operation 820, the synchronizing unit 920 may receive stream source inserted with the generated CTS based on the time clock providing to the system for media synchronization 500. Here, the CTS may include time synchronized between at least one other user terminal and the user terminal 900 and may include time for synchronizing decoding time between a plurality of stream sources provided to the user terminal 900.

For example, when including time for synchronizing decoding time between the plurality of stream sources, the synchronizing unit 920 may synchronize decoding time of a buffer controller corresponding to each of the plurality of stream sources based on the time included in the CTS. Accordingly, when decoding time of the buffer controller is adjusted through synchronizing, each of stream sources may be played and displayed on a monitor of the user terminal 900. For example, when multi-view viewing is provided, each of synchronized videos corresponding to multi-view may be displayed on the monitor of the user terminal 900. When the user terminal 900 is a VR gear, a plurality of synchronized tiles corresponding to user's view may be played.

Figure 10:
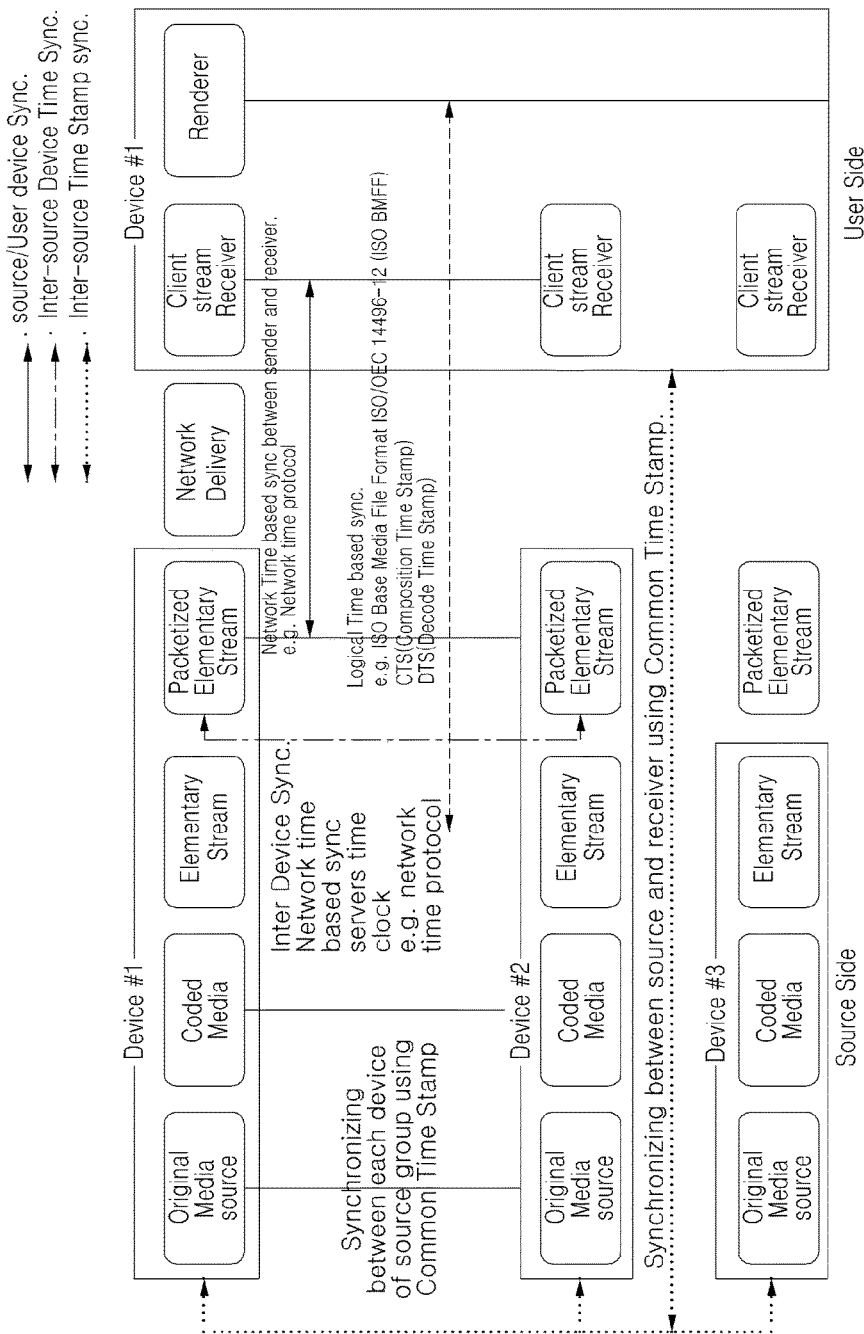
FIG. 10 illustrates an example of describing an overall flow performing synchronization between sources and synchronization on a network according to an example embodiment.

FIG. 10 illustrates an example of describing an overall flow performing synchronization between sources and synchronization on a network according to an example embodiment.

According to FIG. 10, a source device and a system for media synchronization which is a server may be implemented as one device and the system for media synchronization may be separately located in a cloud.

Referring to FIG. 10, synchronization between devices of a source group may be performed by using a CTS and synchronization between source and a user terminal (client device #1) may be performed by using a CTS. Also, network delay may be measured, and synchronization between a server and a terminal may be performed based on the measured network delay.

Accordingly, synchronization may be performed considering H/W characteristics and S/W characteristics for each device, and network delay, and for this, synchronization between CTS based stream connecting devices may be performed.

For example, when synchronization based on MPEG-DASH/HLS is provided, synchronization may be provided by controlling stream request point in the terminal using java script based delay controller. Also, when synchronization is provided by installing a mobile application or S/W, synchronization may be performed by implementing separate delay controller and managing directly condition information of media stream buffer and decode buffer. Besides, when synchronization is provided through H/W implementation, device profile information for delay characteristic information for each source device after synchronization using Flash Light and the like may be generated, and then, when recording/live streaming, synchronization between source devices may be performed based on information included in the device profile.

Accordingly, in a case of MPEG-DASH/HLS, it may be applied to the existing service without separate user environment change and ms level synchronization may be possible through control at decoder level of the final user terminal when synchronizing by installing a mobile application or S/W. Also, sophisticated synchronization of the source device (i.e. media source) group may be possible through H/W implementation during synchronizing.

As described above, stream sources separately recorded and generated in the source device may be transmitted to the system for media synchronization 240, 500 which is a server, by being streamed through each different network environment. Here, the system for media synchronization 240, 500 may transmit a plurality of stream sources, i.e., multi sources to at least one user terminal 250 in a separate stream rather than mixing the plurality of stream sources to one stream. Like this, when the stream is transmitted to the user terminal 250, a time difference may additionally occur in a separate section that the stream is transmitted. Accordingly, synchronization in the plurality of user terminals for the multi source may be performed in the system for media synchronization 240, 500 which is a server, and hereafter, an operation providing synchronization by modularizing required functions will be described referring to FIG. 11.

Figure 11:
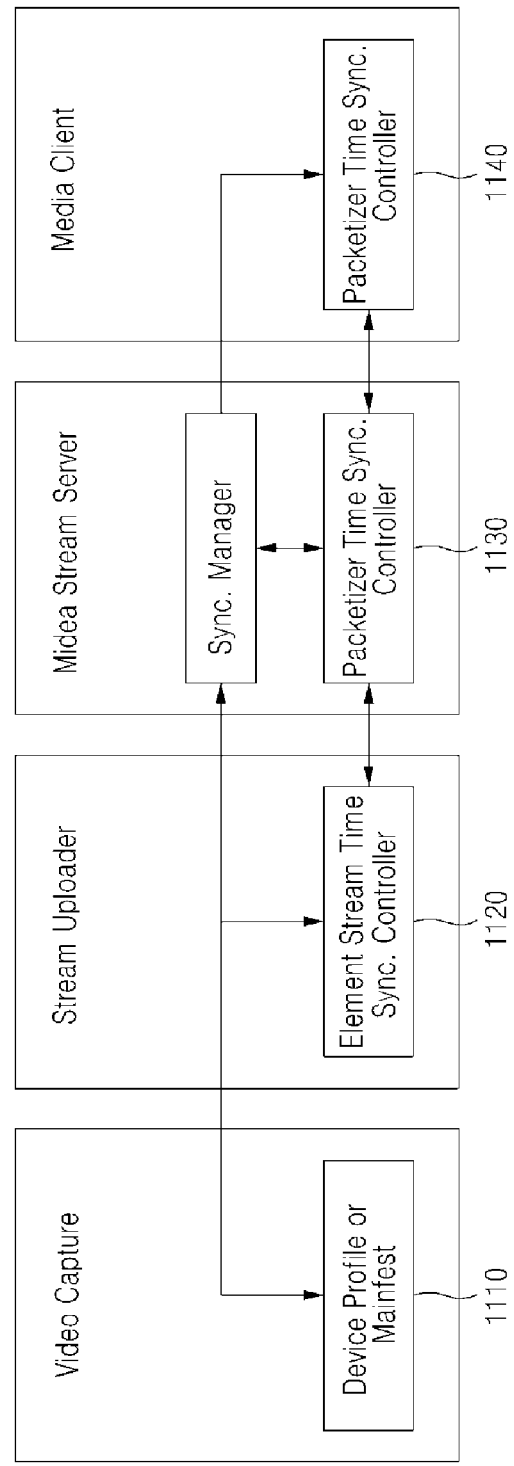
FIG. 11 illustrates an example of describing a network environment that synchronization function is modularized according to an example embodiment.

FIG. 11 illustrates an example of describing a network environment that synchronization function is modularized according to an example embodiment.

According to FIG. 11, a network may be formed between a video capture 1110, a stream uploader 1120, a media stream server 1130, and a media client 1140. In FIG. 11, the video capture 1110 and the stream uploader 1120 may correspond to the media capture devices 210 and the stream uploaders 230 of FIG. 2. In this case, the video capture 1110 may be configured to include the encoding devices 220. Besides, the media capture devices 210 and the stream uploaders 230 may be implemented as a single source device.

Referring to FIG. 11, main functions (e.g., synchronization function) of each device 1110, 1120, 1130, 1140 may be modularized to provide synchronization in a video streaming network environment.

The video capture 1110 may include device profile or manifest to record delay information of a corresponding module. Device information on the video capture 1110 may be changeable, but may not a form of dynamically changing. Therefore, the video capture 1110 may be defined as a form of profile without a separate module and may be used to record delay information of the corresponding module. For example, codec types, encoding options, resolution information, frame rate information, GoP (Group of Pictures) size information, and the like may be recorded.

The stream uploader 1120 may include an element stream time synchronization controller, and the element stream time synchronization controller may control the stream uploader and time clock of time stamp of ES (Element Stream) and setting of stream protocol. Here, control information for controlling the time clock and the setting of protocol may include PTS (Presentation Time Stamp) information and DTS (Decoded Time Stamp) information of ES and may be used to performing delay adjustment through buffer controller of up streamer, transmission priority adjustment according to protocol specific characteristics, and time synchronization of a device.

The media stream server 1130 may include a synchronization manager and a packetizer time synchronization controller. Here, the synchronization manager may correspond to modularizing at least one of the delay information generating unit 520 and synchronization information setting unit 530 of FIG. 5. For example, synchronization function performed in the delay information generating unit 520 and the synchronization information setting unit 530 may be integrated to one and modularized to the synchronization manager, and at least two or only one of the delay information generating unit 520 and the synchronization information setting unit 530 may be modularized to the synchronization manager. Also, the packetizer time synchronization controller may correspond to modularizing the synchronization function performed in at least one of the information collecting unit 510, the delay measuring unit 540, the synchronization information updating unit 550, and the terminal synchronizing unit 560 of FIG. 5. In other words, the packetizer time synchronization controller may be performed by at least one of the information collecting unit 510, the delay measuring information 540, the synchronization information updating unit 550, and the terminal synchronizing unit 560.

First, the synchronization manager may represent a module controlling and supervising overall delay between multi source and multi client video streaming in IP environment. CTS (common time stamp) which is common time clock may be controlled through the synchronization manager, whether the time is synchronized between each device may be confirmed and time synchronization between devices may be controlled.

The packetizer time synchronization controller may amend an individual time difference between input stream (e.g., stream input from the video capture 1110 and the stream uploader 1120 which are source devices) and output stream (e.g., stream provided to the media client 1140) of the media stream server 1130 which is a server device and perform maximum delay setting and the like considering the overall network situation. For example, the packetizer time synchronization controller may collect delay information between source devices or user terminals and set delay information for synchronization based on minimum delay. Here, in a case of a user terminal included in the network environment exceeding the set delay value, the synchronization function between the user terminals may be controlled to be off.

The media client 1140 may include a decoder time synchronization controller. The decoder time synchronization controller may control information related to decoding performance of the media client.

For example, the decoder time synchronization controller may determine appropriate resolution and frame rate for processing multi source stream based on predetermined maximum processing frame rate information of the media client. In other words, resolution and frame rate suitable (corresponding to) for decoding of the multi stream source among a plurality of resolution and frame rate may be determined. Here, time stamp information of de-packetized video stream generated on a decoded buffer for determining resolution and frame rate corresponding to multi source stream may be modified.

Also, the decoder time synchronization controller may control delay for start time delay and the like through management of the CTS which is common time clock and control of play speed for synchronization between each of the user terminals.

Figure 12:
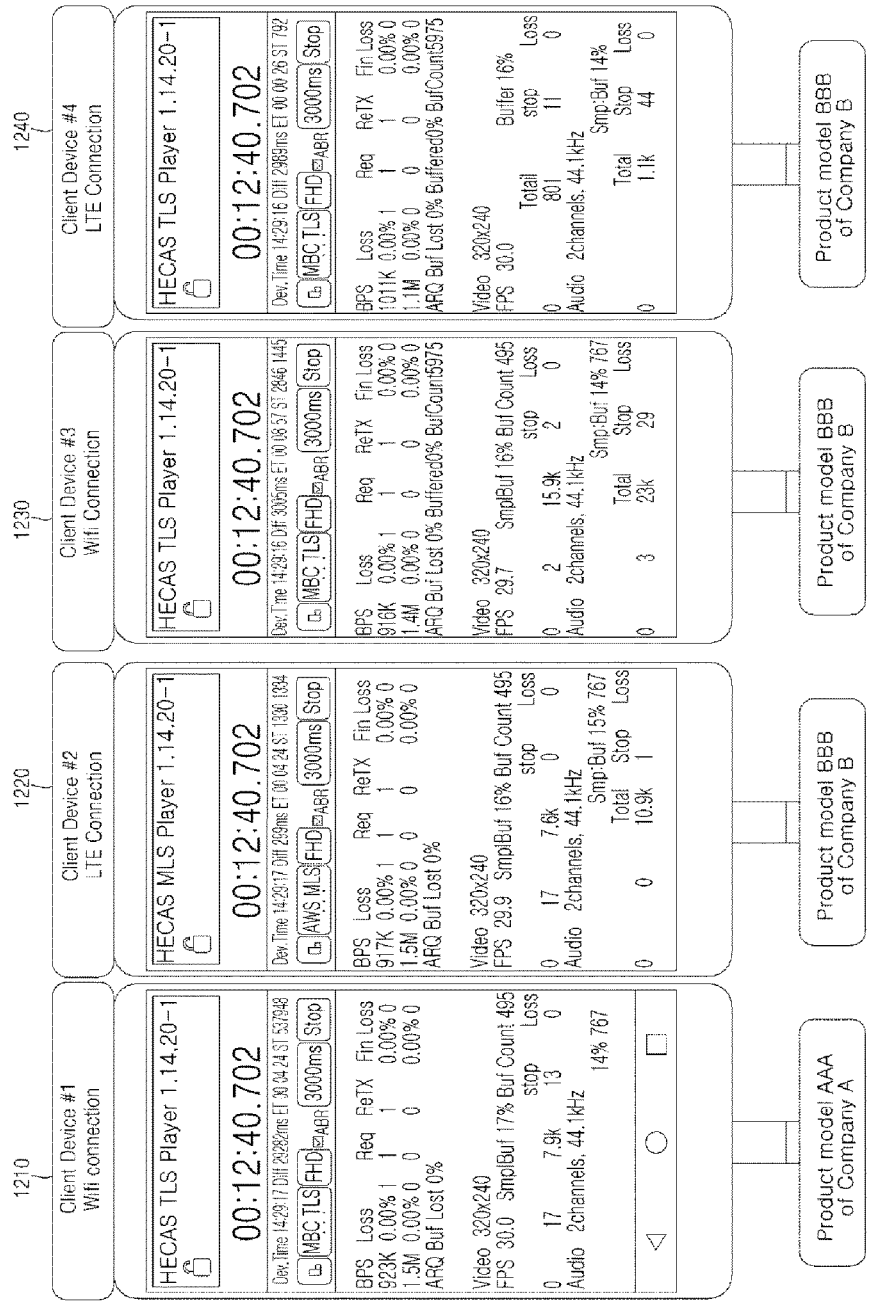
FIG. 12 illustrates an example of describing a screen configuration indicating an experimental result that time synchronization is performed according to an example embodiment.

FIG. 12 illustrates an example of describing a screen configuration indicating an experimental result that time synchronization is performed according to an example embodiment.

In FIG. 12, a stop watch video may be used to indicate a screen shot captured screen composition relating to time synchronization experiment result. The experiment of FIG. 12 is to verify a function for synchronization on multiple user terminals 1210, 1220, 1230, 1240 for multi source streams (i.e., multiple video streams) through a module included in the media stream server 1130 which is a server device and a module included in the media client 1140. A network environment for the experiment may include two servers (e.g., the media stream server providing video stream) and four user terminals (e.g., test player implemented in a smartphone and the like). Here, the four user terminals 1210, 1220, 1230, 1240 may perform wireless Internet through WiFi or LTE connection. Also, one of the user terminals used for test for decoding performance difference may be configured to a device from different manufacturer. For example, different devices with different manufacturers may be configured that terminal 1210 may be a product model AAA of company A (e.g., LG G5 and the like) and the terminals 1220 to 1240 may be a product model BBB of company B (e.g., Sam Sung Galaxy 7 edge and the like). In the case of stop watch content used as video stream, since the frame rate is 30 fps, when actual video is taken by using a screen shot function and determined, the verification of $30/1000$ ms level may be possible.

In FIG. 12, an operation of an actual test may be performed in a form of transmitting simultaneously stream through console to the two servers and connecting the servers by using a client program installed in each of the user terminals.

FIG. 12 may indicate results recording stop watch contents playing in each of user terminals (i.e., the terminals 1210 to 1240 connected to video stream) connected with a communication session established with the server. Referring to FIG. 12, it may be confirmed that contents recorded in each of the user terminals 1210 to 1240 indicate the same video frame and in the case of the terminal 1230, update of frame occurs in ms unit. Also, it may be confirmed that synchronization between multi clients in multi source occurs at about $30/1000$ ms level for the four terminals 1210, 1220, 1230, 1240.

Software may include a computer program, a code, an instruction, or a combination of one or more of them and configure or command independently or collectively the processing device to operate as desired. Software is distributed on a computer system connected with network and may be saved and executed in the distributed method. Software and data may be stored on one or more computer-readable mediums.

The methods according to the above-described exemplary embodiments of the inventive concept may be implemented with program instructions which may be executed through various computer means and may be recorded in computer-readable media. The media may also include, alone or in combination with the program instructions, data file, data structure, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like Program instructions include both machine code, such as produced by the computer using an interpreter.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. A method for media synchronization, comprising: collecting stream source information; generating network delay information between stream sources by performing a delay test between the stream sources; setting synchronization information of a stream source corresponding to a specific channel based on the collected stream source information and the network delay information; measuring network delay with at least one user terminal to receive the stream source; updating the synchronization information based on the measured network delay; and performing time synchronization with the at least one user terminal based on a time clock of the at least one user terminal comprising requesting the time clock of a corresponding terminal to each of a plurality of user terminals when the plurality of user terminals requests to provide the stream source;
receiving the time clock of a corresponding terminal from each of the plurality of user terminals in response to the requesting of the time clock; and performing time synchronization between the plurality of user terminals based on the received time clock comprising
generating a common time stamp based on the time clock of the corresponding terminal and identifier
information of the corresponding terminal; and providing a stream inserted with the generated common time stamp to each of the plurality of user terminals.

2. A method for media synchronization, comprising: collecting stream source information; generating network delay information between stream sources by performing a delay test between the stream sources; setting synchronization information of a stream source corresponding to a specific channel based on the collected stream source information and the network delay information; measuring network delay with at least one user terminal to receive the stream source; updating the synchronization information based on the measured network delay;
and performing time synchronization with the at least one user terminal based on a time clock of the at least one user terminal comprising
generating the time clock between a system for media synchronization and the at least one user terminal based on the time clock of the at least one user terminal; generating a common time stamp including synchronized time based on the generated time clock; and inserting the generated common time stamp in each stream corresponding to different channels to be transmitted and transmitting the each stream to the at least one user terminal.

3. The method of claim 2, wherein the stream inserted with the common time stamp is played in accordance with decoding time based on the common time stamp.

4. The method of claim 2, wherein the performing time synchronization with the at least one user terminal comprises correcting a time difference between the stream source received from a source device and stream to transmit to the at least one user terminal.

5. The method of claim 2, wherein the collecting information collects delay information from a source device forming the at least one user terminal and the network and the at least one user terminal, the performing time synchronization with the at least one user terminal controls the synchronization function between the at least one user terminal[s] to be off based on the collected delay information.

6. The method of claim 2, wherein the collecting stream source information collects device profile information or manifest information of a source device from the source device providing the stream source.

7. The method of claim 2, wherein the setting synchronization information of stream source comprises: determining whether a plurality of stream sources is synchronized with each other after arranging the plurality of sources in asset form when the plurality of sources is provided to at least one [a] user terminal; and performing synchronization between the sources by setting synchronization information of each of the plurality of stream sources based on the determination result.

8. The method of claim 1, wherein the performing time synchronization with the at least one user terminal comprises correcting a time difference between the stream source received from a source device and stream to transmit to the at least one user terminal.

9. The method of claim 1, wherein the collecting information collects delay information from a source device forming the at least one user terminal and the network and the at least one user terminal, the performing time synchronization with the at least one user terminal controls the synchronization function between the at least one user terminal to be off based on the collected delay information.

10. The method of claim 1, wherein the collecting stream source information collects device profile information or manifest information of a source device from the source device providing the stream source.

11. The method of claim 1, wherein the setting synchronization information of stream source comprises: determining whether a plurality of stream sources is synchronized with each other after arranging the plurality of sources in asset form when the plurality of stream sources is provided to a user terminal; and performing synchronization between the sources by setting synchronization information of each of the plurality of stream sources based on the determination result.

12. A system for media synchronization, comprising:
a memory having computer readable instructions stored thereon and at least one processor configured to execute the computer readable instructions to collect stream source information, generate network delay information between stream sources by performing a delay test between the stream sources, set synchronization information of a stream source corresponding to a specific channel based on the collected stream source information and the network delay information, measure network delay with at least one user terminal to receive the stream source, and update the synchronization information based on the measured network delay;
wherein the at least one processor is configured to execute the computer readable instructions to request time clock of a corresponding terminal to each of a plurality of user terminals when the plurality of user terminals requests to provide the stream source, receive time clock of a corresponding terminal from each of the plurality of user terminals in response to the requesting of the time clock, and perform time synchronization between the plurality of user terminals based on the received time clock; and
wherein the at least one processor is configured to execute the computer readable instructions to generate a common time stamp based on the time clock of the corresponding terminal and identifier information of the corresponding terminal and provide[s] a stream inserted with the generated common time stamp to each of the plurality of user terminals.

13. The system of claim 12, wherein the at least one processor collects device profile information or manifest information of a source device from the source device providing the stream source.

14. The system of claim 12, wherein at least one processor determines whether a plurality of stream sources is synchronized with each other after arranging the plurality of sources in asset form when the plurality of stream sources is provided to at least one user terminal and performs synchronization between the sources by setting synchronization information of each of the plurality of stream sources based on the determination result.

15. A system for media synchronization, comprising:
a memory having computer readable instructions stored thereon and
at least one processor, configured to execute the computer readable instructions, to collect stream source information, generate network delay information between stream sources by performing a delay test between the stream sources, set synchronization information of a stream source corresponding to a specific channel based on the collected stream source information and the network delay information, measure network delay with at least one user terminal to receive the stream source, and update the synchronization information based on the measured network delay;

wherein at least one processor generates time clock between the system for media synchronization and the at least one user terminal based on the time clock of the at least one user terminal, generates a common time stamp including synchronized time based on the generated time clock, inserts the generated common time stamp in each stream corresponding to different channels to be transmitted, and transmits the each stream to the at least one user terminal.

16. The system of claim 15, wherein the stream inserted with the common time stamp is played in accordance with decoding time based on the common time stamp.

17. A method for media synchronization in a user terminal, comprising:

providing time clock of a terminal to a server providing a stream source; and synchronizing decoding time between other user terminals or a plurality of stream sources provided with the stream source from the server based on a common time stamp including synchronized time based on the provided time clock;

wherein the common time stamp comprises synchronized time between terminals generated from the server based on time clock of each of a plurality of user terminals, and the synchronizing synchronizes with other user terminals provided with the stream source based on the common time stamp including the synchronized time between the terminals.

18. The system of claim 15, wherein the at least one processor collects device profile information or manifest information of a source device from the source device providing the stream source.

19. The system of claim 15, wherein the at least one processor determines whether a plurality of stream sources is synchronized with each other after arranging the plurality of sources in asset form when the plurality of stream sources is provided to at least one user terminal and performs synchronization between the sources by setting synchronization information of each of the plurality of stream sources based on the determination result.

* * * * *